Patented Dec. 19, 1950

2,534,936

UNITED STATES PATENT OFFICE 2,534,936

STABILIZED VINYL CHLORIDE POLYMERS

Henry A. Walter, Longmeadow, Mass., assignor to Monsanto Chemical Company, St. Louis, Mo., a corporation of Delaware No Drawing. Application August 10, 1948, Serial No. 43,533

10 Claims. (Cl. 260—45.7)

This invention relates to the art of stabilizing vinyl chloride polymers.

The stabilization of vinyl chloride polymers against deterioration on exposure to elevated temperatures has presented a serious problem. A number of additives have been suggested for imparting heat stability to such polymers but relatively few are especially effective.

It is an object of this invention to provide vinyl chloride polymers having improved resistance to deterioration.

A particular object of this invention is to provide vinyl chloride polymers having increased resistance to discoloration at elevated temperatures.

These and other objects are accomplished according to this invention by intimately mixing an aliphatic ester of an aryl thiosulfonic acid with a vinyl chloride polymer.

The following examples are illustrative of the present invention but are not to be construed as limitative thereof. Where parts are mentioned, they are parts by weight.

Example I 100 parts of polyvinyl chloride resin are intimately mixed with 2 parts of the ethyl ester of para-tolyl-thiosulfonic acid. The resulting mixture is molded into disks about ¼ inch thick and 2 inches in diameter by pressing at a temperature of 150–160° C. The resulting disks are yellow in color.

In contrast to the above results, disks made by similar treatment of the polyvinyl chloride in the absence of stabilizer are dark brown in color.

Example II

Example I is repeated except that the allyl ester of para-tolyl-thiosulfonic acid is substituted for the stabilizer used in Example I. Disks molded under the same conditions are somewhat lighter in color than the disks of Example I.

Example III

Example II is repeated except that the amount of stabilizer is reduced to 0.5 part. Disks molded from the product are somewhat more colored than those of Example II but are noticeably lighter in color than the control disks described in Example I.

Example IV

Example II is repeated except that the amount of stabilizer is raised to 5 parts. Further improvement in resistance to discoloration on heating is obtained although not proportional to the increase in stabilizer content.

Example V

Example I is repeated except that the ethyl ester of phenyl-thiosulfonic acid is used as the stabilizer. Improved resistance to discoloration on heating as compared with the control is noted.

Example VI

Example I is repeated except that the allyl ester of para-diphenyl thiosulfonic acid is used as the stabilizer. The results on heating show that this stabilizer is also effective in increasing the heat resistance of polyvinyl chloride.

Example VII

Example I is repeated except there is substituted for polyvinyl chloride, a vinyl chloride-vinyl acetate copolymer made up of 90% vinyl chloride and 10% vinyl acetate by weight. Substantial improvement on exposure to heat is noted as compared with unstabilized copolymer.

Example VIII

Example I is repeated except that there is substituted for polyvinyl chloride, a vinyl chloride-diethyl maleate copolymer made up of 80% vinyl chloride and 20% diethyl maleate by weight. The stabilized copolymer is found to be less discolored on heating than the unstabilized copolymer.

The amount of stabilizer incorporated in vinyl chloride resins may be substantially varied. However, it is usually desirable to incorporate at least 0.5 part in every 100 parts of polymer. On the other hand, it is usually not desirable to include more than 10 parts of stabilizer for every 100 parts of polymer. Also it is generally not considered desirable to incorporate an amount of stabilizer which is so large as to be incompletely compatible with the polymer.

As stabilizers there may be used aliphatic esters of aryl thiosulfonic acids in which the aliphatic groups contain not over 4 carbon atoms and in which the aryl group may be substituted by aliphatic groups containing not over 7 carbon atoms. In place of the ethyl and allyl esters shown in the examples such aliphatic esters may be used as the methyl, propyl and butyl esters and the corresponding esters in which the aliphatic group contains ethylenic unsaturation, e. g., the vinyl, crotyl, etc. esters.

The aryl group in the thiosulfonic acid may be phenyl, diphenyl, naphthyl, anthracyl, etc. or aliphatic derivatives thereof, i. e., substitution products thereof in which the aryl group may be substituted by one or more aliphatic groups containing not over 7 carbon atoms, e. g., methyl, ethyl, propyl, butyl, hexyl, heptyl, vinyl, crotyl and allyl groups. In some cases the aryl group may contain two or more aliphatic substituents. The substituents may occupy any of the free positions in the aryl groups. Examples of substituted aryl groups include the ortho, meta and para tolyl groups, the various dimethyl-phenyl groups, e. g., those derived from ortho, meta and para xylene, ethyl phenyl, trimethyl-phenyl groups, propyl phenyl, etc.

In place of the polyvinyl chloride, copolymers of vinyl chloride and other unsaturated materials copolymerizable therewith may be stabilized in accordance with the invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chloro-styrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. The class of polymers in which at least 10% and, more especially, a predominant portion, i. e., more than 50% by weight, of the copolymer is made from vinyl chloride, represents a preferred class of polymers to be treated according to the invention.

A particularly preferred embodiment of the invention comprises the stabilization of polymers prepared by copolymerizing vinyl chloride and an ester of an $\alpha,\beta$-unsaturated dicarboxylic acid such as diethyl maleate, in which 5–20 parts by weight of diethyl maleate are used for every 95–80 parts by weight of vinyl chloride. Among the preferred esters of $\alpha,\beta$-unsaturated dicarboxylic acids are the alkyl esters in which the alkyl group contains 1–8 carbon atoms.

When desired, other stabilizers may be included along with the stabilizers of the invention. Thus, it may be desirable to include a material having a light stabilizing effect, as for example, such organo-metallic compounds as dibutyl tin diacetate, dibutyl tin dilaurate, etc. Thus, the inclusion of 0.25–1 part of such a stabilizer along with 2 parts of the stabilizer of the invention per 100 parts of polymer results in a product of exceptionally good light and heat stability.

It is obvious that many variations may be made in the products and processes of this invention without departing from the spirit and scope thereof as defined in the appended claims.

What is claimed is:

1. A composition comprising 100 parts of a polymer consisting predominantly of polyvinyl chloride and, as a heat stabilizer therefor, from 0.5 to 10 parts of an aliphatic ester of an aryl thiosulfonic acid of the formula $$R-Ar-SO_2-S-R_1$$

in which R stands for a radical from the group consisting of hydrogen and aliphatic groups having less than 8 carbon atoms, $R_1$ stands for an aliphatic group having less than 5 carbon atoms and Ar stands for an aryl group.

2. A composition as defined in claim 1 in which the thiosulfonate is a phenyl thiosulfonate.

3. A composition as defined in claim 1 in which the thiosulfonate is an aklyl phenyl thiosulfonate.

4. A composition as defined in claim 1 in which the thiosulfonate is an alkylene phenyl thiosulfonate.

5. A composition as defined in claim 1 in which the thiosulfonate is a tolyl thiosulfonate.

6. A composition as defined in claim 1 in which the polymer is polyvinyl chloride.

7. A composition as defined in claim 1 in which the polymer is a copolymer of vinyl chloride and vinyl acetate.

8. A composition as defined in claim 1 in which the polymer is a copolymer of vinyl chloride and diethyl maleate.

9. A composition as defined in claim 1 in which the polymer is polyvinyl chloride and the stabilizer is ethyl-paratolyl-thiosulfonate.

10. A composition as defined in claim 1 in which the polymer is polyvinyl chloride and the stabilizer is allyl-para-tolyl-thiosulfonate.

HENRY A. WALTER.

No references cited.